United States Patent [19]

Munari

[11] Patent Number: 6,032,822
[45] Date of Patent: Mar. 7, 2000

[54] SPOON-CARRYING HANDLE FOR A COOKING UTENSIL

[75] Inventor: Francesco Munari, Al Campo, Italy

[73] Assignee: La Termoplastic F.B.M. S.R.L., Asago Seprio, Italy

[21] Appl. No.: 09/029,100

[22] PCT Filed: Jul. 31, 1996

[86] PCT No.: PCT/EP96/03368

§ 371 Date: May 7, 1998

§ 102(e) Date: May 7, 1998

[87] PCT Pub. No.: WO97/06719

PCT Pub. Date: Feb. 27, 1997

[30] Foreign Application Priority Data

Aug. 11, 1995 [IT] Italy .................................. MI95A1781

[51] Int. Cl.$^7$ ................................................. B65D 25/10
[52] U.S. Cl. ...................... 220/573.1; 220/756; 220/912; 220/735
[58] Field of Search ................................ 220/573.1, 756, 220/912, 574.1, 735

[56] References Cited

U.S. PATENT DOCUMENTS

| 769,119 | 8/1904 | Strickland | 220/912 |
| 846,010 | 3/1907 | Corbell | 220/912 |
| 2,034,940 | 3/1936 | Butler | 220/756 |
| 2,493,751 | 1/1950 | Davis | 220/756 |
| 5,105,963 | 4/1992 | Scott | 220/756 |
| 5,325,982 | 7/1994 | Cobbs, Jr. | 220/756 |

*Primary Examiner*—Joseph M. Moy
*Attorney, Agent, or Firm*—Steinberg & Raskin, P.C.

[57] ABSTRACT

In the handle (12) for cooking utensils (10), in correspondence with or in the vicinity of that of its ends connected to the cooking utensil there is provided a seat (14) into which the free end of the handgrip (12) of a spoon can be inserted a certain distance so that the widened part of this latter becomes located above the cooking utensil at a height less than the remaining part of the spoon, but not such that the spoon can withdraw from said seat by gravity.

8 Claims, 2 Drawing Sheets

SPOON-CARRYING HANDLE FOR A COOKING UTENSIL

FIELD OF THE INVENTION

This invention relates to a handle for cooking utensils, in particular for frying pans.

BACKGROUND OF THE INVENTION

It is normal experience during cooking to use a spoon, usually of wood, for mixing food undergoing cooking in a frying pan or Saucepan, then having completed this operation not to know where to rest the spoon which, if laid on the cooking hob soils it, being itself now soiled with the mixed food. The spoon is sometimes left in the frying pan, with the risk that as its handle projects from the frying pan it catches fire, or becomes black in the long term if of wood or of another material sensitive to prolonged heating, in that region which projects just beyond the frying pan. To avoid these drawbacks, a plate is sometimes placed on the hob on which to rest the spoon, but with the result that the plate becomes soiled.

OBJECT AND SUMMARY OF THE INVENTION

Appropriate objects designed to receive the spoon are available commercially for locating on the cooking hob or in its vicinity. However such objects, on receiving the spoon, also become soiled and have to be washed.

U.S. Pat No. 1,580,532 discloses a handle for a cooking utensil, comprising on its outer and, i.e. the end opposite to that connected to the cooking utensil, a seat which permits to suspend a spoon over the handle. The main drawback of this handle is that, once the spoon is connected to the handle, the latter may no longer be held, and therefore the cooking utensil may no longer be moved. Moreover, as the seat is provided on the outer end of the handle, the widened part of the spoon, is suspended at least partially over the handle unless it has an extremely long handgrip. Therefore, if the spoon is soiled it may drip over the handle, soiling it.

The main object of the present invention is to solve in a simple and comfortable manner the problem of where to rest the spoon once soiled, without soiling the cooking hob, plates or the like.

A further object is to ensure that the spoon does not become ruined as a result of its contact with the upper edge of the cooking utensil.

The aforesaid main object is attained by the cooking utensil handle according to the present invention, characterised in that in correspondence with or in the vicinity of that of its ends connected to the cooking utensil there is provided a seat into which the free end of the handgrip of a spoon can be inserted a certain distance so that the widened part of this latter becomes located above the cooking utensil at a height less than the remaining part of the spoon, but not such that the spoon can withdraw from said seat by gravity. In this manner the spoon, when inserted into the seat provided in the handle, assumes a position in which, even if soiled with sauces or condiments causing consequent dripping, the droplets fall directly into the cooking utensil, without resultant soiling.

Preferably the seat is shaped in such a manner as to maintain the spoon spaced from the upper edge of the cooking utensil, to prevent the spoon undergoing damage or burning if of wood or another material which degrades on making contact with the hot cooking utensil. In this manner the other object of the invention is also attained.

BRIEF DESCRIPTION OF THE DRAWINGS

The invention will be more apparent from the description of one embodiment thereof given hereinafter with reference to the accompanying drawings, in which.

DETAILED DESCRIPTION OF THE PREFERRED EMBODIMENTS

Figure 1:
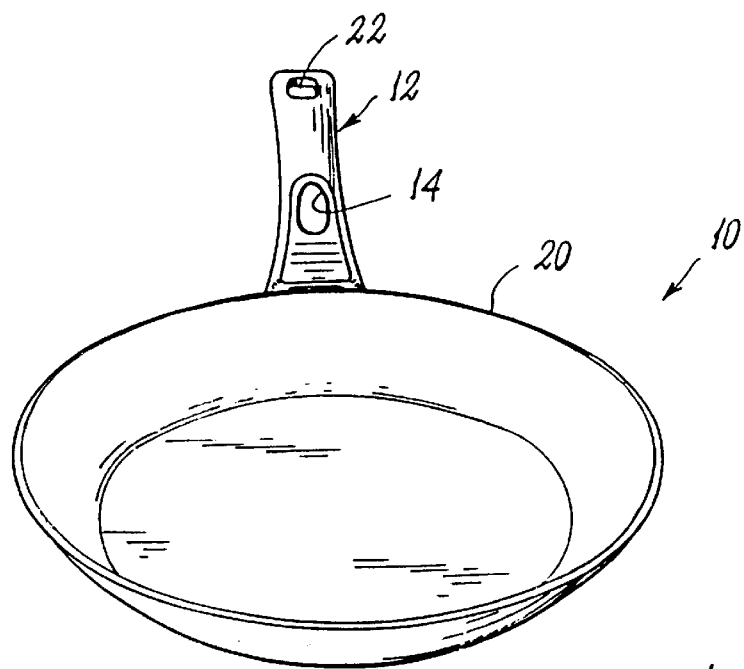
FIG. 1 is a first perspective view of a frying pan provided with the handle according to the present invention.
Figure 2:
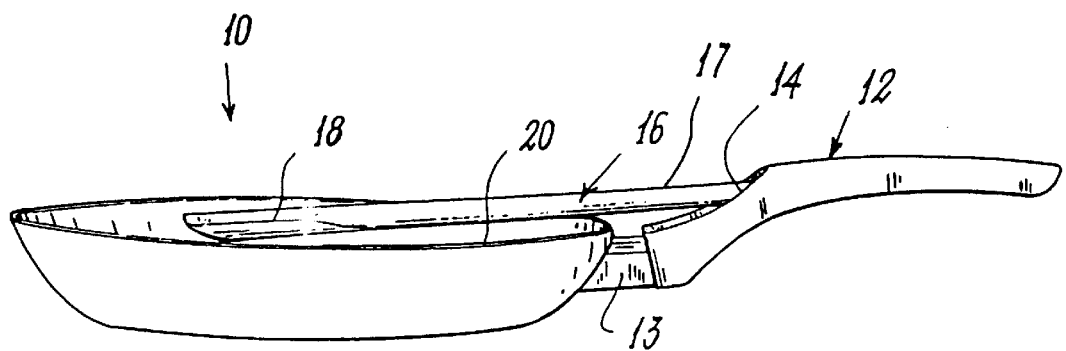
FIG. 2 is a second perspective view thereof taken from a different viewpoint, with a wooden spoon inserted into the hole.
Figure 3:
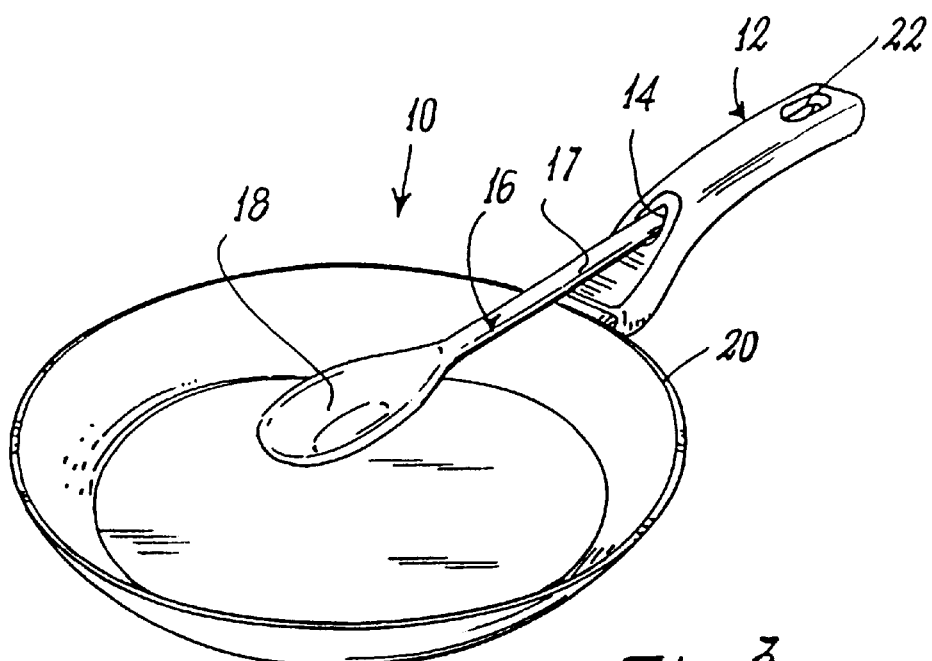
FIG. 3 is a third perspective view thereof with the spoon again present.

As can be seen from FIGS. 1 to 3, the frying pan 10 is provided with a handle 12 extending radially observing the frying pan from the top downwards, the end 13 (FIG. 2) of the handle 12 being fixed to the frying pan 10 in a conventional manner. As can be best seen in FIG. 1, the handle 12 presents a seat comprising a through hole 14 through which a certain length of the handle 17 of a normal wooden spoon 16 can be inserted. As the handle 12 of the frying pan 10 has an inverted U cross-section (this cannot be directly noted from the figures), that part of the spoon handgrip 17 not visible in FIGS. 2 and 3 is contained between the two lateral walls of the handle 12 forming the two branches of the U and rests against the upper wall of the handle 12 forming the transverse part of the U. The free end of the handle 12 has a terminal wall (not clearly visible in the figures) which acts as a limit stop for the free end of the handgrip 17 of the spoon 16, so that the handgrip 17 cannot be inserted through the hole 14 more than a certain amount. As can be seen from FIGS. 2 and 3, when the spoon 16 is in the illustrated position, its widened part 18 lies at a lesser height than its handgrip 17. Consequently if the spoon 16 is soiled with any substance which can drip, the droplets always fall into the frying pan.

From FIG. 2 it can be clearly seen that the spoon 16 does not make contact with the upper edge 20 of the frying pan, from which it is spaced.

Figure 4:
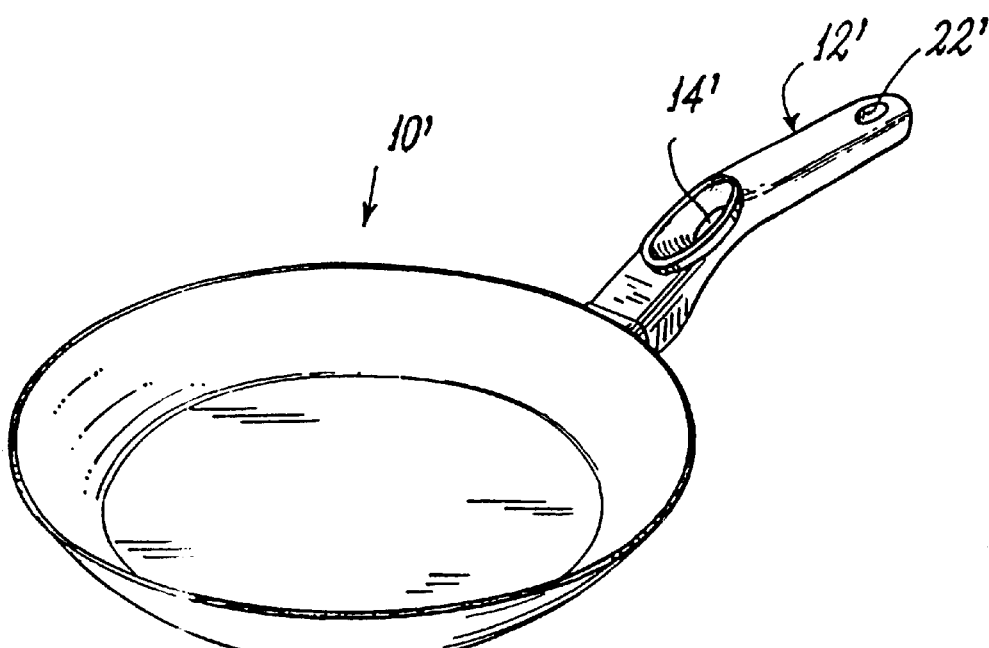
FIG. 4 is a perspective view of a frying pan provided with a modified handle according to the invention.

FIG. 4 shows a frying pan 10' which differs from the frying pan 10 only in terms of the handle 12'. This latter differs from the handle 12 only in that the lower part of the mouth of the hole 14 slightly projects, in order to offer a better support for the handgrip 17 of the spoon 16.

Both the handle 12 and the handle 12' comprise a further usual hole 22 in the vicinity of their free end, for hanging up the relative frying pan.

I claim:

1. A handle for cooking utensils having an end connected to the cooking utensil and a free end, comprising an elongate upper wall and two downwardly extending side walls forming a channel therebetween, a seat arranged in correspondence with or in a vicinity of the end of the handle connected to the cooking utensil, said seat being structured and arranged such that at least a portion of a handgrip of a spoon is received within said channel, said seat having a length such that the handgrip is insertable into said seat a certain distance and a widened part of the spoon becomes located above the cooking utensil at a height less than the remaining part of the spoon, but not such that the spoon can withdraw from said seat by gravity.

2. The handle of claim 1, wherein said seat is shaped in such a manner as to maintain the spoon spaced from an upper edge of the cooking utensil.

3. The handle of claim 1, further comprising a terminal wall arranged at the free end and structured and arranged to limit insertion of the handgrip into the channel.

4. The handle of claim 1, wherein said seat comprises a through hole through which the handgrip is insertable.

5. The handle of claim 4, wherein at least a lower part of a mouth of said through hole projects to offer a better support handgrip.

6. The handle of claim 1, wherein said seat is arranged in correspondence with the end of the handle connected to the cooking utensil.

7. The handle of claim 1, wherein said seat is arranged in the vicinity of the end of the handle connected to the cooking utensil.

8. A handle for cooking utensils, comprising an elongate section, an upwardly extending angular section coupling said elongate section to the cooking utensil, and a seat arranged in said angular section being structured and arranged such that at least a portion of a handgrip of a spoon is received below said elongate section.

* * * * *

UNITED STATES PATENT AND TRADEMARK OFFICE
CERTIFICATE OF CORRECTION

PATENT NO. : 6,032,822
DATED : March 7, 2000
INVENTOR(S) : Francesco Munari

It is certified that error appears in the above-identified patent and that said Letters Patent is hereby corrected as shown below:

<u>Title page,</u>
Item [75] Inventor's address should read— Cardano Al Campo, Italy--.
Item [73] Assignee's address should read— Arsago Seprio, Italy--.

Signed and Sealed this

Seventeenth Day of July, 2001

*Attest:*

Nicholas P. Godici

*Attesting Officer*

NICHOLAS P. GODICI
*Acting Director of the United States Patent and Trademark Office*